United States Patent [19]

Possati et al.

[11] 4,364,177
[45] Dec. 21, 1982

[54] COMPARATOR FOR VERIFYING LINEAR DIMENSIONS OF MECHANICAL PARTS

[75] Inventors: Mario Possati; Guido Golinelli, both of Bologna; Narciso Selleri, Monteveglio, all of Italy

[73] Assignee: Finike Italiana Marposs S.p.A., S. Marino di Bentivoglio, Italy

[21] Appl. No.: 266,331

[22] Filed: May 22, 1981

[30] Foreign Application Priority Data

Jun. 2, 1980 [IT] Italy ................................ 3433 A/80

[51] Int. Cl.³ .............................................. G01B 7/12
[52] U.S. Cl. .............................. 33/147 K; 33/178 E; 33/148 H
[58] Field of Search ............. 33/172 R, 178 R, 178 E, 33/178 F, 147 K, 148 H, 147 N, 143 L, 199 J

[56] References Cited

U.S. PATENT DOCUMENTS 1,928,457  9/1933  Mershon et al. ............... 33/178 EV
3,943,632  3/1976  Albertazzi ......................... 33/174 L
3,958,338  5/1976  Anichini et al. .................. 33/178 E
4,290,204  9/1981  Possati .......................... 33/143 L X

FOREIGN PATENT DOCUMENTS 1010553  2/1974  Italy .

Primary Examiner—Harry N. Haroian
Attorney, Agent, or Firm—Stevens, Davis, Miller & Mosher

[57] ABSTRACT

Manual plug comparator for verifying inside diameters of mechanical parts comprising a perforated support plate, a first member of substantially U shape fastened to the plate and a second member having a base fastened to the first member, two elastically yieldable sections and two arms which are movable due to the deformations of the elastically yieldable sections. The two arms bear the elements of a position transducer and, at their free ends respective feelers adapted to touch the part to be checked.

10 Claims, 4 Drawing Figures

COMPARATOR FOR VERIFYING LINEAR DIMENSIONS OF MECHANICAL PARTS

The present invention relates to a comparator for checking the linear diameters of mechanical parts, having a first support element, a second support element fastened to the first support element, two measurement arms which are movable with respect to the second support element, two feelers fastened to the movable arms respectively to make contact with the part to be checked and means adapted to note the mutual position of the movable arms.

BACKGROUND OF THE INVENTION

The traditional comparators for the checking of linear diameters comprise numerous mechanical parts which are obtained by machining of material and then duly connecting the parts together.

These known comparators customarily assure good performance as to precision and reproducibility of measurement but are rather expensive, since they require lengthy and complicated machining and assembling operations.

The technical problem which the present invention is directed at solving is to provide a comparator which is adapted in particular for checking inside diameters of small values, and consists of a limited number of very simple parts and is of rather low manufacturing cost.

SUMMARY OF THE INVENTION

The technical problem with which this invention is concerned is solved by a comparator of the type mentioned at the beginning of the present specification which comprises a first support element defining a perforated plate; a second support element fastened to the first support element; two measurement arms movable with respect to the second support element; two feelers fastened to the movable arms respectively so as to come into contact with the part to be checked; and means adapted to detect the mutual position of the movable arms, said second support element comprising essentially a rigid first member fastened to said perforated plate and located on one side of the plate, and a second member fastened to said first member, said second member defining a first rigid portion, two elastically yieldable sections adapted to permit the measurement displacements of the arms and second and third rigid portions which define the arms, said arms passing through a hole in said plate and bearing said feelers at ends located, with respect to the plate on a side opposite that on which said rigid first member is located.

BRIEF DESCRIPTION OF THE DRAWINGS

The present invention will be described in more detail with respect to the embodiments shown in the accompanying drawings given by way of non-limiting example, in which equal or equivalent parts are marked by the same reference numerals and in which.

DETAILED DESCRIPTION OF THE DRAWINGS

Figure 1:
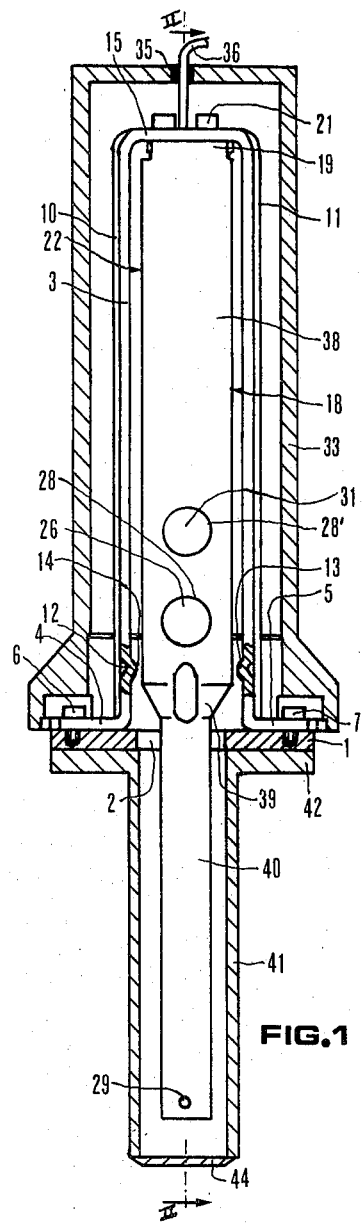
FIG. 1 is a side view, partially in section, of a manual plug comparator.

Referring to FIGS. 1 to 4, the comparator comprises a first support element consisting of a circular plate 1 having a central hole 2 and a second rigid support element comprising a member 3 formed from a shaped and bent plate, having substantially the shape of an inverted U, with two horizontal flanges 4, 5 obtained by bending the ends of the U.

The member 3 is connected to the plate 1 by screws 6, 7 which pass through holes 8, 9 in the flanges 4, 5 and screw into threaded holes in the plate 1. The lower surface of the flanges 4, 5 is thus clamped onto the upper face of the plate 1.

The vertical sides of the member 3, namely the sides of the U, have central reinforcement ribs 10, 11. Furthermore, in the vertical sides of the member 3 there are provided two pairs of limiting nipples 12, 13 adjacent to the central ribs 10, 11. The inner surfaces of the nipples 12, 13, for instance the surface indicated by the reference number 14 in FIG. 1, constitute mechanical stops the function of which will be explained further below.

The upper part 15 of the member 3, namely the base of the U, having substantially the shape of a rectangular plate with two sides connected to the sides of the U, has a central hole 16 and four lateral holes 17.

A second member 18, made of a single piece of plate which has been shaped and stamped, comprises a base 19 with a central hole 20 aligned with the hole 16, and four lateral threaded holes, not visible, aligned with the holes 17. Four screws 21 connect the base 19 of the member 18 to the upper part 15 of the member 3.

The member 18 has two arms 22, 23 connected to the base 19 by two elastically yieldable sections 24, 25 obtained by reducing the thickness of the plate by two external bevels; the two sections 24, 25 define in substance two fulcrums or pivot axes around which the arms 22, 23 can rotate, effecting the measurement movements. With the exception of the sections 24, 25 the member 18 is substantially rigid.

The arms 22, 23 which are substantially identical, have seats 28 to house elements 26 which act as stop for a spring 27 and seats 28' to house two elements of a position transducer. The spring 27, interposed between the arms 22, 23, works by compression and therefore tends to open the arms, pushing towards the outside, in substantially radial direction (since the measurement displacements are small). Two feelers 29, 30 are suitably fastened to the free ends of the arms 22, 23.

The position transducer comprises a small cylinder 31 containing the primary winding and the two secondary windings of a differential transformer. The cylinder 31 is fastened to the seat 28' of the arm 22. The transducer furthermore comprises a small shaft 32, fastened to the seat 28' of the arm 23, which bears at one free end a magnetic core, not visible, which is movable within the windings of the differential transformer in such a manner as to vary the magnetic coupling of the secondary windings with respect to the primary winding.

A handle 33 fastened to the plate 1 by screws 34 is provided at its upper base with a hole 35 for the passage of an electric cord 36 which is connected to the windings contained in the cylinder 31 and to a supply a detection and amplification group, not shown. Between the surface of the hole 35 and the cord 36 there is inserted a cord-holder 37.

Each of the arms 22, 23, for instance the arm 22, has a forst portion of linear axis 38 contained, together with the member 3, within the handle 33, a second connecting portion 39 located at the lower part of the handle 33, and a third linear portion 40 which passes through the hole 2 of the plate 1. The three portions 38, 39, 40 have substantially a C-shaped section, so as to present high resistance to flexure.

A nose 41 for protecting and centering the comparator in the hole to be checked is fastened to the plate 1 by four screws, not visible, which hold the upper face of a flange 42 of the nose 41 clamped to the lower face of the plate 1.

The nose 41 has holes 43 for the passage of the feelers 29, 30 and is closed at its bottom by a plate 44.

Figure 2:
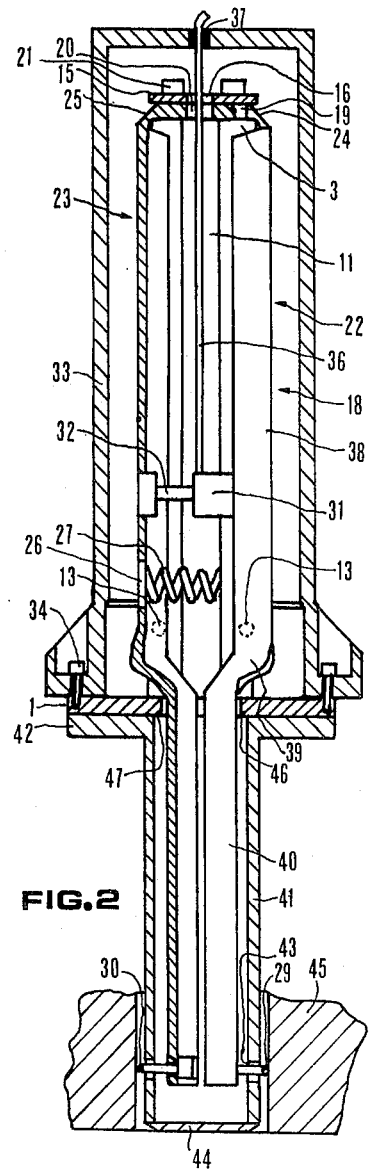
FIG. 2 is a front view of the comparator of FIG. 1, partially in section along the line II—II of FIG. 1.
Figure 3:
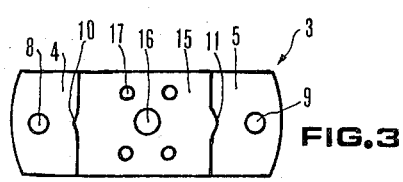
FIG. 3 is a plan view of a support member for the moving unit of the comparator of FIGS. 1 and 2 and FIG. 4 is a horizontal section through the support member of FIG. 3 looking from the bottom towards the top.
Figure 4:
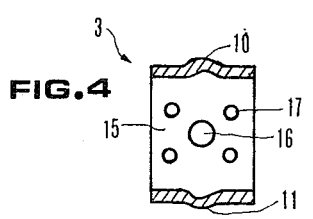

As can be noted from FIGS. 1 and 2, the outside diameter and the outside diameter of the nose 41 are smaller than the inside diameter of the handle 33.

As a matter of fact, the comparator shown is adapted to check very small inside diameters (less than 3 cm, for instance) of mechanical parts 45. Therefore the portions 40 of the arms 22, 23 which are located within the nose 41 are very close together while portions 38 located within the handle 33 are further apart so as to be able to contain the spring 27 and the transducer and permit the base 19 to be securely fastened to the upper part 15 of the member 3.

The surface of the hole 2 of the plate 1 has two reentrants 46, 47 (FIG. 2) which define stop surfaces for the portions 40 of the arms 22, 23 so as to limit the opening of the arms.

The nipples 12, 13 by their corresponding stop surfaces 14 also act as limiters. As a matter of fact, the distance between the facing stop surfaces 14 is slightly greater than the width of the section of the arms 22, 23 and the stop surfaces 14 face the sides of the C-shaped section of the arms.

During the assembling of the comparator, the nipples 12, 13 facilitate the proper insertion of the member 18 between the two sides of the member 3.

The facing surfaces of the opposite nipples 12, 13 are preferably substantially conical and the vertices of the conical surfaces, which are sharp or slightly rounded, define the stop surfaces 14; the latter therefore are of very limited size in order to avoid the accumulation of any foreign substances on the stop surfaces and thus assure constant limitation.

When the comparator has been completely or partially assembled, the nipples 12, 13 limit any displacements to acceptable values of the arms 22, 23 in direction perpendicular to the geometrical axis which passes, in condition of rest through the feelers 29, 30 (for purposes of the precision of the measurements and of the prevention of permanent deformations in the sections 24, 25).

Furthermore, the presence of this limitation makes it possible to provide a slight amount of play between the surface of the core of the transducer and the windings of the differential transformer, having the assurance at the same time that the core does not come into contact with the windings as a result of undesired displacements.

Under normal conditions such displacements do not take place since the members 3 and 18 and the sections 24, 25 have shapes which withstand torsional forces well while the nipples 12, 13 offer assurances against accidental blows against the feelers of the arms (for instance when the nose 41 is mounted) or in the event that, during the dynamic verification of hole (with relative rotation between comparator and the part to be checked 45) frictional forces of the feelers 29, 30 are present on the surface of the hole in an amount greater than normal.

As can be noted, the principal mechanical parts which constitute the comparator shown are very few in number; a principal support element (the plate 1), a substantially U-shaped member (the member 3), another member (18) which defines the arms and the corresponding pivots, a handle (33), and a nose (41).

Therefore the mechanical structure of the comparator is particularly simple and economical, at the same time assuring excellent service and very reduced space and weight.

The operation of the comparator, with the exception of the details described above, does not differ from that of the traditional comparators and therefore will not be described.

Although the embodiment shown refers to a manual plug comparator for checking inside diameters it is obvious that the invention can find various applications, for instance for the construction of comparators for checking the widths of grooves.

What is claimed is:

1. A comparator for the checking of linear dimensions of mechanical parts comprising: a first support element defining a perforated plate; a second support element comprising essentially a rigid first member fastened to said perforated plate and located on one side of the plate; a second member fastened to said first member, said second member defining a first rigid portion, second and third rigid portions which define measurement arms and two elastically yieldable sections arranged between the first rigid portion and the second and third rigid portions, for permitting measurement displacements of the arms; two feelers fastened to the measurement arms, respectively, so as to come into contact with the part to be checked, said arms passing through a hole in said plate and bearing said feelers at ends located, with respect to the plate, on a side opposite that on which said rigid first member is located; and means adapted to detect the mutual position of the measurement arms.

2. The comparator according to claim 1 for checking inside diameters including a nose adapted to be introduced into the hole of the part to be checked, said nose being fastened to the perforated plate and housing portions of the arms comprising said ends bearing the feelers; the means adapted to detect the mutual position of the arms comprising a position tranducer having mutually movable elements fastened to portions of the arms arranged, with respect to the plate, on the same side as that on which said rigid first member is located.

3. The comparator according to claim 2, including elastic means acting on the arms to determine the contact forces of the feelers on the part to be checked, said elastic means being connected to said portions of the arms to which said mutually movable elements of the position transducer are fastened.

4. The comparator according to one of claims 1 to 3, wherein said first member is of substantially U shape, the ends of the U being fastened to the plate, said member being fastened to the base of the U.

5. The comparator according to claim 4, wherein each of the sides of the said U has stop surfaces adapted to limit displacements of the measuring arms substantially in a direction to the geometrical axis passing through the feelers.

6. The comparator according to one of claims 1 to 3, wherein said first and second members are formed of respective pieces of plate which have been shaped and folded.

7. The comparator according to one of claims 1 to 3, including a handle for the manual use of the plug, said handle being fastened to said perforated plate and housing said first member and the first rigid portion of the second member.

8. The comparator according to claim 4 wherein the ends of said U terminate with flanges fastened to the plate and the sides of the U have central strengthening ribs.

9. A comparator according to claim 5, wherein each of the sides of said U has a central strengthening rib and a pair of nipples adjacent to said central rib, the nipples defining said stop surfaces.

10. A comparator according to claim 9, wherein said nipples have substantially conically facing inner surfaces and the stop surfaces are defined by the vertices of the conical surfaces.

* * * * *

UNITED STATES PATENT AND TRADEMARK OFFICE
CERTIFICATE OF CORRECTION

PATENT NO. : 4,364,177
DATED : December 21, 1982
INVENTOR(S) : Mario POSSATI et al.

It is certified that error appears in the above—identified patent and that said Letters Patent is hereby corrected as shown below:

Column 3, line 2, change "forst" to --first--;
Column 3, line 17, change "outside" to --inside--;
Column 3, line 67, change "of" to --or--;
Column 4, line 64, --second-- should be inserted after "said";
Column 5, line 1, after "direction" insert --perpendicular--.

Signed and Sealed this

Twenty-second Day of March 1983

[SEAL]

Attest:

GERALD J. MOSSINGHOFF

Attesting Officer     Commissioner of Patents and Trademarks